United States Patent
Yu

(10) Patent No.: US 11,522,172 B2
(45) Date of Patent: Dec. 6, 2022

(54) NEGATIVE ELECTRODE FOR LITHIUM METAL BATTERY, MANUFACTURING METHOD OF THE SAME, AND LITHIUM METAL BATTERY INCLUDING THE SAME

(71) Applicant: LG CHEM, LTD., Seoul (KR)

(72) Inventor: Jeong In Yu, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 151 days.

(21) Appl. No.: 16/651,747

(22) PCT Filed: Aug. 1, 2019

(86) PCT No.: PCT/KR2019/009594
§ 371 (c)(1),
(2) Date: Mar. 27, 2020

(87) PCT Pub. No.: WO2020/032475
PCT Pub. Date: Feb. 13, 2020

(65) Prior Publication Data
US 2020/0259163 A1  Aug. 13, 2020

(30) Foreign Application Priority Data

Aug. 10, 2018  (KR) .................... 10-2018-0093984
Jul. 26, 2019  (KR) .................... 10-2019-0090886

(51) Int. Cl.
*H01M 4/00* (2006.01)
*H01M 4/134* (2010.01)
(Continued)

(52) U.S. Cl.
CPC ......... *H01M 4/134* (2013.01); *H01M 4/0404* (2013.01); *H01M 4/1395* (2013.01);
(Continued)

(58) Field of Classification Search
CPC .... H01M 4/0404; H01M 4/366; H01M 4/663; H01M 4/1395; H01M 10/052; H01M 2004/027; H01M 4/668; Y02E 60/10
See application file for complete search history.

(56) References Cited

U.S. PATENT DOCUMENTS

| 5,756,232 A | 5/1998 | Kelly et al. |
| 9,985,326 B2 | 5/2018 | Sun et al. |

(Continued)

FOREIGN PATENT DOCUMENTS

| CN | 1415123 A | 4/2003 |
| CN | 104466191 A | 3/2015 |

(Continued)

OTHER PUBLICATIONS

Extended European Search Report for European Application No. 19848117.8, dated Dec. 21, 2020.
(Continued)

*Primary Examiner* — Cynthia H Kelly
*Assistant Examiner* — Monique M Wills
(74) *Attorney, Agent, or Firm* — Birch, Stewart, Kolasch & Birch, LLP

(57) ABSTRACT

A negative electrode for a lithium metal battery, a manufacturing method thereof, and a lithium battery including the same. An adhesive layer including a binder and a conductive material between the negative current collector and the negative active material improves conductivity while also improving adherence between a negative current collector and a negative active material of the lithium battery.

13 Claims, 3 Drawing Sheets

(51) Int. Cl.
*H01M 4/04* (2006.01)
*H01M 4/1395* (2010.01)
*H01M 4/38* (2006.01)
*H01M 4/62* (2006.01)
*H01M 10/052* (2010.01)
*H01M 4/02* (2006.01)

(52) U.S. Cl.
CPC ............ *H01M 4/382* (2013.01); *H01M 4/623* (2013.01); *H01M 4/625* (2013.01); *H01M 10/052* (2013.01); *H01M 2004/027* (2013.01)

(56) References Cited

U.S. PATENT DOCUMENTS

| | | | |
|---|---|---|---|
| 2005/0064289 A1* | 3/2005 | Suzuki | H01M 4/0419 252/182.1 |
| 2005/0112469 A1 | 5/2005 | Goto et al. | |
| 2014/0057170 A1 | 2/2014 | Cha et al. | |
| 2014/0370349 A1 | 12/2014 | Kwon et al. | |
| 2014/0370350 A1 | 12/2014 | Kwon et al. | |
| 2015/0280212 A1 | 10/2015 | Son et al. | |
| 2016/0293943 A1 | 10/2016 | Hu et al. | |
| 2017/0062829 A1 | 3/2017 | Ryu et al. | |
| 2017/0294688 A1 | 10/2017 | Jang et al. | |
| 2019/0131617 A1 | 5/2019 | Ahn et al. | |
| 2019/0140266 A1 | 5/2019 | Yun | |
| 2019/0393541 A1* | 12/2019 | Jang | H01M 10/0565 |

FOREIGN PATENT DOCUMENTS

| | | |
|---|---|---|
| CN | 105009330 A | 10/2015 |
| CN | 106486699 A | 3/2017 |
| CN | 107221709 A | 9/2017 |
| CN | 107579204 A | 1/2018 |
| CN | 107615521 A | 1/2018 |
| CN | 108346523 A | 7/2018 |
| JP | 2001-357854 A | 12/2001 |
| JP | 2005-158397 A | 6/2005 |
| JP | 2018-113220 A | 7/2018 |
| KR | 10-2001-0011032 A | 2/2001 |
| KR | 10-2002-0039824 A | 5/2002 |
| KR | 10-2006-0083171 A | 7/2006 |
| KR | 10-2012-0092529 A | 8/2012 |
| KR | 10-2014-0026856 A | 3/2014 |
| KR | 10-2014-0132291 A | 11/2014 |
| KR | 10-2016-0037784 A | 4/2016 |
| KR | 10-2018-0016344 A | 2/2018 |
| KR | 10-2018-0027953 A | 3/2018 |
| KR | 10-2018-0062963 A | 6/2018 |
| KR | 10-2018-0077083 A | 7/2018 |
| WO | WO 2016/160958 A1 | 10/2016 |

OTHER PUBLICATIONS

International Search Report (PCT/ISA/210) issued in PCT/KR2019/009594, dated Nov. 22, 2019.

* cited by examiner

NEGATIVE ELECTRODE FOR LITHIUM METAL BATTERY, MANUFACTURING METHOD OF THE SAME, AND LITHIUM METAL BATTERY INCLUDING THE SAME

CROSS-REFERENCE TO RELATED APPLICATION

This application claims priority to and the benefit of Korean Patent Application No. 10-2018-0093984 filed in the Korean Intellectual Property Office on Aug. 10, 2018, and Korean Patent Application No. 10-2019-0090886 filed in the Korean Intellectual Property Office on Jul. 26, 2019, the entire contents of which are incorporated herein by reference.

BACKGROUND OF THE INVENTION

(a) Field of the Invention

The present invention relates to a negative electrode for a lithium metal battery, a manufacturing method of the same, and a lithium battery including the same.

(b) Description of the Related Art

A lithium metal battery is a battery to which a negative active material of a lithium metal (Li-metal) or a lithium alloy (Li-alloy) material is applied, and has an advantage of having a very high theoretical energy capacity.

The negative electrode of the lithium battery is generally manufactured by a physical compression method. Specifically, as a method for manufacturing the negative electrode of the lithium battery, a method in which a thin membrane of the lithium metal (Li-metal) or the lithium alloy (Li-alloy) material is disposed on a negative current collector and then is compressed by using a roll-press is known.

Thus, since the negative electrode of the lithium battery manufactured by the compression method without a binder has weak adherence between the negative current collector and the negative active material, during the battery operation, an electrolyte solution may penetrate between the negative current collector and the negative active material, and as the volume of lithium of the negative active material changes, a gap between the negative current collector and the negative active material may gradually increase.

This is one of the reasons why the lithium metal battery is not yet commercially available.

SUMMARY OF THE INVENTION

In one embodiment of the present invention, an adhesive layer including a binder and a conductive material between a negative current collector and a negative active material to improve conductivity while improving adherence between the negative current collector and the negative active material of the lithium battery is introduced.

In detail, in one embodiment of the present invention, a negative electrode for a lithium metal battery is provided, including: a negative current collector; an adhesive layer disposed on one surface or both surfaces of the negative current collector and including a binder and a conductive material; and a lithium metal (Li-metal) thin membrane disposed on the adhesive layer.

DETAILED DESCRIPTION OF THE EMBODIMENTS

Figure 1:
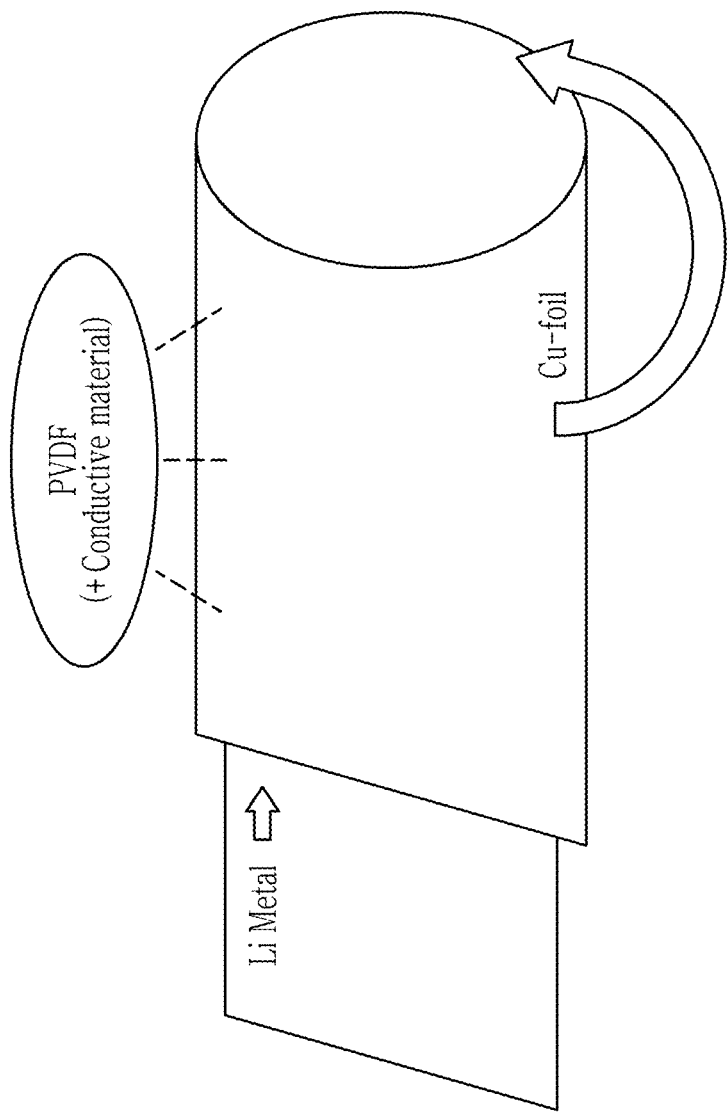
FIG. 1 is a view schematically showing a method for manufacturing a negative electrode for a lithium metal battery of an exemplary embodiment.

Throughout the present specification, unless explicitly described to the contrary, the word "comprise" and variations such as "comprises" or "comprising" will be understood to imply the inclusion of stated elements but not the exclusion of any other elements. The terms "approximately" and "substantially" used in the specification are used to refer to the same value as or a value close to a specific permissible error in manufacture and materials, and are also used to prevent an unscrupulous infringer from improperly using the disclosure where accurate or absolute values are mentioned to help understanding of the present specification. As used throughout this specification, the term "step -ing" or "step of" does not mean "step for".

In the present specification, the term "combination of these" included in the expression of a Markush form means one or more mixtures or combinations selected from a group consisting of configuration components described in the Markush form representation, and it means to include one or more selected from the group consisting of the configuration components.

Based on the above definition, exemplary embodiments of the present invention are now described in detail. However, these are presented as examples, but the present invention is not limited thereto and is only defined by the scope of the claims to be described later.

Negative Electrode for a Lithium Metal Battery

In an exemplary embodiment of the present invention, a negative electrode for a lithium metal battery is provided, including: a negative current collector comprising a first and a second surface; an adhesive layer disposed on the first surface or both the first and second surface of the negative current collector, wherein the adhesive layer comprises a binder; and a lithium metal (Li-metal) thin membrane disposed on a surface of the adhesive layer.

In general, when manufacturing a positive electrode or a negative electrode of a lithium ion battery, in order to attach an electrode active material in a particle state on an electrode current collector, it is common to use a binder and a slurry coating method. In detail, the electrode active material, the binder, and a conductive material are mixed in a solvent to produce a slurry, and the slurry is coated on the electrode current collector and dried. Next, an electrode composite layer is formed on the electrode current collector, and the electrode active material, the binder, and the conductive material are mixed in this electrode composite layer.

In contrast, as a pure lithium metal of a thin membrane that is not particles is used as a negative active material, it is common to manufacture the negative electrode of the lithium battery by laminating and physically compressing the negative current collector such as a copper foil and a lithium metal (Li-metal) thin membrane.

However, since the negative electrode of the lithium battery manufactured by the compression method without the binder has weak adherence between the negative current collector and the negative active material, the electrolyte solution may penetrate between the negative current collector and the negative active material during battery operation, a secondary reaction is accelerated from this, and a secondary reaction product acts as a resistance layer to deteriorate performance of the battery. In addition, as mentioned above, the gap between the negative current collector and the negative active material may gradually increase according to a volume change of lithium of the negative active material.

On the other hand, the negative electrode for the lithium metal battery according to an exemplary embodiment, unlike the negative electrode of a generally known lithium metal battery, is not manufactured using a physical compression method, an adhesive layer is provided between the negative current collector and the lithium metal (Li-metal) thin membrane, thereby improving adherence therebetween. FIG. 1 is a view schematically showing a manufacturing method of a negative electrode for a lithium metal battery according to an exemplary embodiment.

In detail, in the negative electrode for the lithium metal battery according to an exemplary embodiment, unlike the electrode composite layer of the lithium ion battery in which the electrode active material, the binder, and the conductive material are all mixed, the electrode active material and the binder are separated, the adhesive layer is disposed between the negative current collector and the lithium metal thin membrane corresponding to the negative active material of the lithium battery, and the binder and the conductive material are included in the adhesive layer.

The binder may have excellent adherence to the lithium metal thin membrane as well as the negative current collector without having reactivity to the negative current collector. Thus, the negative current collector and the lithium metal (Li-metal) thin membrane may be improved through the binder included in the adhesive layer.

The negative electrode with improved adherence may help to improve the lifespan characteristic and safety of the lithium battery.

Furthermore, the conductive material improves the conductivity of the negative electrode, thereby lowering the initial resistance of the lithium battery including the same and suppressing the increase in resistance during the cycle progress.

Adhesive Layer

The binder included in the adhesive layer is not particularly limited as long as it has adherence to the lithium metal thin membrane as well as the negative current collector.

For example, the binder may include polyvinylidene fluoride (PVDF), derivatives thereof, or mixtures thereof.

The polyvinylidene fluoride (PVDF), the derivatives thereof, or the mixtures thereof may have low reactivity with lithium metal and thus may be suitable for use as the binder.

On the other hand, rather than the adhesive layer consisting of only the binder, in the case of the adhesive layer containing the conductive material in addition to the binder, it improves the conductivity of the lithium metal negative electrode, thereby being advantageous for suppressing the increase in resistance during the operation of the battery.

The conductive material is not particularly limited as long as the material has conductivity, but may include one or a mixture of two or more selected from the group consisting of carbon black, carbon nanotubes, natural graphite, artificial graphite, and carbon fiber.

A weight ratio (i.e., conductive material/binder) of the conductive material to the binder may be $1/4$ to 4, specifically $1/3$ to 3. Since the specific surface area of the conductive material is large, the adherence may be degraded when the conductive material is added at a high ratio. However, when the weight ratio of the conductive material/binder is $1/4$ or more to 4 or less, the conductivity may be secured with appropriate adherence.

Meanwhile, the thickness ratio of the adhesive layer to the negative current collector may be $1/10$ to $1/20$, specifically $1/10$ to $1/15$ (described order: the adhesive layer/the current collector). In addition, the thickness ratio of the adhesive layer to the lithium metal thin membrane may be $1/20$ to $1/40$, specifically $1/30$ to $1/40$ (based on the order of the adhesive layer/the lithium metal thin membrane). In contrast to each thickness of the negative current collector and the lithium metal thin membrane, if the adhesive layer is too thick, the adhesive layer may act as a resistor. Therefore, the thickness ratio of the adhesive layer/the current collector may be limited as described above as the minimum thickness having the property of adhesion.

The adhesive layer of an exemplary embodiment may be formed on one side of the negative current collector, or may be formed on both sides thereof. In this regard, the negative electrode for the lithium metal battery of the an exemplary embodiment has the structure of the negative current collector/the adhesive layer/the lithium metal thin membrane in the former case, and the structure of the lithium metal thin membrane/the adhesive layer/the negative current collector adhesive layer/the lithium metal thin membrane in the latter case. In contrast to the case of being formed on one side, when formed on both sides, there is an advantage in an increase of the capacity of the battery cell, but to the exemplary embodiment is not limited thereto.

Manufacturing Method of a Lithium Metal Negative Electrode

In another exemplary embodiment of the present invention, the manufacturing method of the negative electrode for the lithium metal battery includes: a step of coating a composition including a binder, a conductive material, and a solvent on one surface or both surfaces of a negative current collector; and a step of stacking a lithium metal membrane on the coated surface of the negative current collector.

In the manufacturing method of an exemplary embodiment, as the binder is used to manufacture the negative electrode of the lithium battery, the adherence may be improved between the negative current collector and the negative active material in preparation for the physical compression method.

Specifically, the manufacturing method of an exemplary embodiment employs a wet process rather than a dry process, thereby being advantageous in reinforcing the mutual adherence of the components consisting of the adhesive layer and the adherence of the negative current collector and the lithium metal thin membrane with the adhesive layer.

Specifically, according to an experimental example to be described later, the difference according to the forming method of the adhesive layer may be confirmed. Specifically, when comparing the case of using the same adhesive layer component, when the adhesive layer is formed by the dry method compared to the wet type, it is confirmed that the capacity retention of the battery is considerably deteriorated, and the resistance is increased considerably.

In the dry processes without the solvent, it is difficult to evenly coat the adhesive layer components on the negative current collector, and if the lithium metal thin membrane is physically compressed onto these non-uniform adhesive layer components, the adherence between the negative current collector and the lithium metal thin membrane may be inferior. As such, when the negative electrode adherence is weak, the electrolyte solution may penetrate between the negative current collector and the lithium metal thin membrane during the battery operation, thereby accelerating a secondary reaction, and a secondary reaction products act as a resistance layer such that the performance of the battery may be deteriorated.

On the other hand, when using the solvent, the adhesive layer components may be evenly coated onto the negative current collector. In addition, when the lithium metal thin membrane is compressed onto the evenly coated adhesive layer components and then dried, it is inferred that not only is the adhesion between the adhesive layer components enhanced while the solvent volatilizes, but also the adherence of the negative current collector and the lithium metal thin membrane via the adhesive layer may be strengthened. As mentioned above, the strong adherence of the negative electrode is one of the factors that enable stable driving while minimizing the resistance increase in the battery.

In the total amount of the composition (100 wt %), the binder may be included at 5 to 40 wt %, specifically 10 to 30 wt %, and the solvent may be included as a balance. If it is desired to form the adhesive layer further including the conductive material, the material to be added may be included at 5 to 40 weight, specifically 10 to 30 wt %, of the total amount of the composition (100 wt %). This corresponds to a range that is 1/10 to 1/6 of the weight of the binder, and a description thereof is described above so is omitted here.

In the step of coating the composition including the binder and the solvent on one surface or both surfaces of the negative current collector, a coating amount (g) of the composition for the cross-section ($cm^2$) of the negative current collector may be 0.005 to 0.01 ($g/cm^2$). This may be appropriately controlled in consideration of the thickness of the finally formed adhesive layer.

Before the step of stacking the lithium metal membrane on the coated surface the negative current collector, a step of drying the coated composition may be further included. In this case, the composition is coated onto the negative current collector, dried for 8 to 16 hours in a room temperature vacuum state, and then may be pressed after the lithium metal thin membrane is stacked.

If it does not include the step of removing the solvent in the coated composition, it may be manufactured by a method in which the lithium metal thin membrane is disposed on it before the composition is dried and is dried for 8 to 16 hours in a room temperature vacuum state and then pressed.

Regardless of drying the coated composition, after the step of stacking the negative current collector and the lithium metal (Li-metal) thin membrane on the coated surface the negative current collector, a step of compressing the stacked negative current collector and lithium metal (Li-metal) thin membrane may be further included.

The compression may be performed by applying heat, pressure, or both. Specifically, the compression may be performed at a pressure corresponding to a gap of the entire thickness of the negative current collector and the lithium metal (Li-metal) thin membrane at a temperature of 50 to 70° C. In addition, an experiment proceeds by applying both heat and pressure during the compression, and when the heat and pressure are simultaneously applied, the adhesion of the current collector and the lithium thin membrane may be further improved. However, in consideration of the targeted negative electrode for the lithium metal battery, the thickness of the current collector, and the adherence characteristic depending on the content of the coated binder and conductive material, it is necessary to appropriately choose heat and pressure of each range.

After the step of stacking the negative current collector and the lithium metal (Li-metal) thin membrane via the coated composition, the composition between the laminated negative current collector and the lithium metal (Li-metal) thin membrane may be converted into the adhesive layer described above.

Lithium Battery

In another exemplary embodiment of the present invention, the lithium battery including the negative electrode, the electrolyte solution, and the positive electrode as above-described is provided.

As the lithium battery of the exemplary embodiment has the advantages of the negative electrode of the exemplary embodiment as described above, the capacity deterioration is suppressed during its operation, and thus may have an improved lifespan characteristic.

The description of the negative electrode applied to the lithium battery of the exemplary embodiment is the same as described above, and hereinafter battery constituent elements other than the negative electrode are described in detail.

The electrolyte of the lithium battery may be a liquid electrolyte (i.e., an electrolyte solution) or may be a solid electrolyte.

If the electrolyte of the lithium battery is the liquid electrolyte, the liquid electrolyte includes a non-aqueous organic solvent and a lithium salt.

The non-aqueous organic solvent acts as a transport medium for ions involved in the electrochemical reaction of the battery.

As the non-aqueous organic solvent, carbonate-based, ester-based, ether-based, ketone-based, alcohol-based, or a non-protonic solvent may be used. As the carbonate-based solvent, dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like may be used, and as the ester-based solvent, methyl acetate, ethyl acetate, n-propyl acetate, 1,1-dimethylethyl acetate, methylpropionate, ethyl propionate, γ-butyrolactone, decanolide, valerolactone, mevalonolactone, caprolactone, and the like may be used. As the ether-based solvent, dibutyl ether, tetraglyme, diglyme, dimethoxyethane, 2-methyltetrahydrofuran, tetrahydrofuran, the like may be used, and as the ketone-based solvent, cyclohexanone and the like may be used. In addition, ethyl alcolol or isopropyl alcohol may be used as the alcohol-based solvent, and as the non-protonic solvent, an amide series such as a nitrile series dimethylformamide such as R—CN (where R is a C2 to C20 linear, branched, or cyclic hydrocarbon group, and may include a double bond aromatic ring or an ether bond), or a dioxolane series or sulfolane series such as 1,3-dioxolane and the like, may be used.

The non-aqueous organic solvent may be used alone or in combination of two or more, and the mixing ratio in the case of mixing two or more may be appropriately adjusted according to the desired battery performance which is widely understood by those skilled in the art.

In the case of the carbonate-based solvent, it is preferable to use a mixture of a cyclic carbonate and a chain carbonate. In this case, the cyclic carbonate and the chain carbonate may be mixed at a volume ratio of about 1:1 to about 1:9, which may result in excellent performance of the electrolyte solution.

The non-aqueous organic solvent may further include an aromatic hydrocarbon-based organic solvent in addition to the carbonate-based solvent. At this time, the carbonate-based solvent and the aromatic hydrocarbon-based organic solvent may be mixed at a volume ratio of about 1:1 to about 30:1.

As the aromatic hydrocarbon-based organic solvent, an aromatic hydrocarbon-based compound of Chemical Formula 1 below may be used.

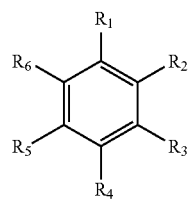

[Chemical Formula 1]

In Chemical Formula 1 above, R1 to R6 are independently hydrogen, a halogen, a C1 to C10 alkyl group, a C1 to C10 haloalkyl group, or a combination thereof, respectively.

The aromatic hydrocarbon-based organic solvent may be benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, or a combination thereof.

The non-aqueous electrolyte may further contain vinylene carbonate or an ethylene carbonate-based compound of Chemical Formula 2 to improve the battery lifespan.

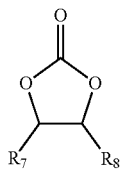

[Chemical Formula 2]

In Chemical Formula 2, $R_7$ and $R_8$ are independently hydrogen, a halogen group, a cyano group (CN), a nitro group ($NO_2$), or a C1 to C5 fluoroalkyl group, and at least one of $R_7$ and $R_8$ is a halogen group, a cyano group (CN), a nitro group ($NO_2$), or a C1 to C5 fluoroalkyl group.

A representative example of the ethylene carbonate-based compound may be difluoroethylene carbonate, chloroethylene carbonate, dichloroethylene carbonate, bromoethylene carbonate, dibromoethylene carbonate, nitroethylene carbonate, cyanoethylene carbonate, fluoroethylene carbonate, etc. In the case of further using the vinylene carbonate or the ethylene carbonate-based compound, the usage amount may be appropriately adjusted to improve the lifespan.

In the electrolyte solution of the lithium battery, the lithium salt is dissolved in the organic solvent and then acts as a supply source of lithium ions, thereby enabling the basic operation of the lithium battery of an exemplary embodiment and playing a role in promoting the movement of lithium ions between the positive electrode and the negative electrode.

The lithium salt may be a lithium salt which is generally applied to an electrolyte solution. For example, $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2)$, $(C_yF_{2y+1}SO_2)$, where x and y are natural numbers), LiCl, LiI, $LiB(C_2O_4)_2$ (lithium bis(oxalato) borate; LiBOB), or combinations thereof may be used, however it is not limited thereto.

In addition, in the electrolyte solution, the concentration of the lithium salt may be controlled within a 0.1 to 5.0 M range. In this range, the electrolyte solution may have appropriate conductivity and viscosity, and the lithium ions may effectively move within the lithium battery of an exemplary embodiment. However, this is only an example, and the present invention is not limited thereto.

The electrolyte solution may be a type that is impregnated in a porous separator positioned between the negative electrode and the positive electrode. Here, any porous separator, which separates the negative electrode and the positive electrode and provides a passage for lithium ions, may be used as long as it is commonly used in a lithium battery. In other words, those having low resistance to ion migration of the electrolyte and excellent electrolyte-wetting ability may be used.

For example, it is selected from glass fiber, polyester, Teflon (tetrafluoroethylene), polyethylene, polypropylene, polytetrafluoroethylene (PTFE), or a combination thereof, and may be in a nonwoven or woven form. For example, a polyolefin-based polymer separator such as polyethylene or polypropylene is mainly used in the lithium ion battery, a coated separator including a ceramic component or a polymer material may be used to secure heat resistance or mechanical strength, and it may optionally be used in a single layer or multilayer structure.

In contrast, when the electrolyte of the lithium battery is a solid electrolyte, the solid electrolyte that may be used is not particularly limited.

Regardless of the electrolyte of the lithium metal battery, the positive electrode may include a positive current collector and a positive composite layer positioned on the positive current collector.

The positive electrode is manufactured by mixing an active material and a binder, and if necessary, a conductive material, a filler, or the like in a solvent to form an electrode mixture in a slurry form and coating the electrode mixture on each electrode current collector. Since such an electrode manufacturing method is well known in the art, so a detailed description thereof is omitted.

In the case of the positive active material, any material of which reversible intercalation and deintercalation of lithium ions is possible can be used, and it is not particularly limited. For example, one or more of metals of cobalt, manganese, nickel, and combinations thereof, and composite oxides of lithium, may be included.

More specifically, for the positive active material, a compound represented by any of the formulas as follows may be used. $Li_aA_{1-b}R_bD_2$ (wherein $0.90 \leq a \leq 1.8$ and $0 \leq b \leq 0.5$); $Li_aE_{1-b}R_bO_{2-c}D_c$ (wherein $0.90 \leq a \leq 1.8$, $0 \leq b \leq 0.5$, and $0 \leq c \leq 0.05$); $LiE_{2-b}R_bO_{4-c}D_c$ (wherein $0 \leq b \leq 0.5$ and $0 \leq c \leq 0.05$); $Li_aNi_{1-b-c}Co_bR_cD_\alpha$ (wherein $0.90 \leq a \leq 1.8$, $0 \leq b \leq 0.5$, $0 \leq c \leq 0.05$, and $0 < \alpha \leq 2$); $Li_aNi_{1-b-c}Co_bR_cO_{2-\alpha}Z_\alpha$ (wherein $0.90 \leq a \leq 1.8$, $0 \leq b \leq 0.5$, $0 \leq c \leq 0.05$, and $0 < \alpha < 2$); $Li_aNi_{1-b-c}Co_bR_cO_{2-\alpha}Z_2$ (wherein $0.90 \leq a \leq 1.8$, $0 \leq b \leq 0.5$, $0 \leq c \leq 0.05$, and $0 < \alpha < 2$); $Li_aNi_{1-b-c}Mn_bR_cD_\alpha$ (wherein $0.90 \le a \le 1.8$, $0 \le b \le 0.5$, $0 \le c \le 0.05$, and $0 < \alpha \le 2$); $Li_aNi_{1-b-c}Mn_bR_cO_{2-\alpha}Z_\alpha$ (wherein $0.90 \le a \le 1.8$, $0 \le b \le 0.5$, $0 \le c \le 0.05$, and $0 < \alpha < 2$); $Li_aNi_{1-b-c}Mn_bR_cO_{2-\alpha}Z_2$ (wherein $0.90 \le a \le 1.8$, $0 \le b \le 0.5$, $0 \le c \le 0.05$, and $0 < \alpha < 2$); $Li_aNi_bE_cG_dO_2$ (wherein $0.90 \le a \le 1.8$, $0 \le b \le 0.9$, $0 \le c \le 0.5$, and $0.001 \le d \le 0.1$); $Li_aNi_b Co_cMn_dGeO_2$ (wherein $0.90 \le a \le 1.8$, $0 \le b \le 0.9$, $0 \le c \le 0.5$, $0 \le d \le 0.5$, and $0 \le e \le 0.1$); $Li_aNiG_bO_2$ (wherein $0.90 \le a \le 1.8$ and $0.001 \le b \le 0.1$); $Li_aCoG_bO_2$ (wherein $0.90 \le a \le 1.8$ and $0.001 \le b \le 0.1$.); $Li_aMnG_bO_2$ (wherein $0.90 \le a \le 1.8$ and $0.001 \le b \le 0.1$); $Li_aMn_2G_bO_4$ (wherein $0.90 \le a \le 1.8$ and $0.001 \le b \le 0.1$); $QO_2$; $QS_2$; $LiQS_2$; $V_2O_5$; $LiV_2O_5$; $LiTO_2$; $LiNiVO_4$; $Li_{(3-f)}J_2(PO_4)_3$ (wherein $0 \le f \le 2$); $Li_{(3-f)}Fe_2(PO_4)_3$ (wherein $0 \le f \le 2$); and $LiFePO_4$.

In the above formulas, A is Ni, Co, Mn, or combinations thereof; R is Al, Ni, Co, Mn, Cr, Fe, Mg, Sr, V, a rare earth element; or combinations thereof; D is O, F, S, P, or combinations thereof; E is Co, Mn, or combinations thereof; Z is F, S, P, or combinations thereof; G is Al, Cr, Mn, Fe, Mg, La, Ce, Sr, V, or combinations thereof; Q is Ti, Mo, Mn, or combinations thereof; T is Cr, V, Fe, Sc, Y, or combinations thereof; and J is V, Cr, Mn, Co, Ni, Cu, or combinations thereof.

Of course, it is also possible to use a coating layer on the compound surface, or a mixture of compounds having the compound and the coating layer may be used. The coating layer may include, as a coating element compound, an oxide of the coating element, a hydroxide of the coating element, an oxyhydroxide of the coating element, an oxycarbonate of the coating element, or a hydroxycarbonate of the coating element. The compounds constituting these coating layers may be amorphous or crystalline. As the coating element included in the coating layer, Mg, Al, Co, K, Na, Ca, Si, Ti, V, Sn, Ge, Ga, B, As, Zr, or mixtures thereof may be used. The coating layer forming process may use any coating method as long as it may be coated with the above compounds by a method that does not adversely affect the physical properties of the positive active material (for example, a spray coating or dipping method), and detailed descriptions thereof are omitted since they can be understood by those skilled in the art.

The positive current collector is typically made with a thickness of 3-500 pm. Such a positive electrode current collector is not particularly limited as long as it has high conductivity without causing a chemical change in the battery, and for example, stainless steel, aluminum, nickel, titanium, or calcined carbon, or aluminum or stainless steel treated with carbon, nickel, titanium, silver, or the like on the surface thereof, may be used. The current collector may form fine protrusions and depressions on its surface to increase the adhesion of the positive active material, and may be in various forms such as a film, a sheet, a foil, a net, a porous body, a foam body, and a nonwoven fabric.

The conductive material is not particularly limited as long as it has conductivity without causing a chemical change in the battery, and for example, graphite such as a natural graphite or artificial graphite; carbon blacks such as carbon black, acetylene black, ketjen black, channel black, furnace black, lamp black, and summer black; conductive fibers such as carbon fiber and metal fiber; a metal powder such as fluorinated carbon, aluminum, and nickel powder; conductive whiskers such as zinc oxide and potassium titanate; conductive metal oxides such as titanium oxide; and conductive materials such as polyphenylene derivatives, may be used.

The lithium battery of the exemplary embodiment may not only be used in a unit cell used as a power source for a small device, but may also be used as a unit battery in a medium- to large-size battery module including a plurality of battery cells. Furthermore, a battery pack including battery modules may be configured.

Hereinafter, exemplary examples of the present invention, comparative examples, and experimental examples for evaluating them are described. However, the following examples are only exemplary embodiments of the present invention, and the present invention is not limited to the following examples.

COMPARATIVE EXAMPLE 1

(1) Manufacture of a Negative Electrode

The composition for forming an adhesive layer is evenly coated with a thickness of about 1 μm on a copper current collector having a cross-section of 1.76 cm² and a circular shape (thickness: 10 μm). Here, the composition for forming the adhesive layer uses polyvinylidene fluoride (PVdF) described in Table 1 below as a binder, and it is mixed with an NMP solvent to be 40.0 wt % of 100.0 wt % of the composition.

In addition, the coating of the composition for forming the adhesive layer was carried out in a 3 m/m in condition by using a doctor blade device.

Before the coated composition for forming the adhesive layer is dried, it is covered with a lithium foil (Li foil) having a thickness of 20 μm, and then roll pressed, and finally heated at 60° C. for 2 hours in a vacuum oven, thereby the composition between the copper current collector and the lithium foil is completely hardened and converted into the adhesive layer.

(2) Manufacture of a Lithium Battery $LiNi_{0.8}Mn0.1Co_{0.1}O_2$ as the positive active material, carbon black as the conductive material, and polyvinylidene fluoride (PVdF) as the binder are used, and the mixture in which the positive active material:the conductive material: the binder are mixed with a weight ratio of 96:2:2 is added to NMP of the solvent to prepare the positive active material slurry.

The positive electrode is prepared by coating the positive active material slurry on one surface of an aluminum current collector with a thickness of 79 μm, drying and rolling it, and punching it to a predetermined size.

A coin cell is prepared by interposing a separator (a base material of a polypropylene-based porous polymer) between the negative electrode and the positive electrode of Comparative Example 1. A lithium metal rechargeable battery is manufactured by inserting the electrolyte solution in which 1 M $LiPF_6$ is dissolved in the solvent in which fluoroethylene carbonate (FEC) and ethyl methyl carbonate (EMC) are mixed at a volume ratio of 30:70 in the coin cell.

COMPARATIVE EXAMPLE 2

(1) Manufacture of a Negative Electrode

Polyvinylidene fluoride (PVdF) is coated on the copper current collector, but it is dry-coated without using the solvent.

Specifically, only polyvinylidene fluoride (PVdF) is uniformly coated with a thickness of about 1 μm on the copper current collector having a cross-section of 1.76 cm² and a circular shape (thickness: 10 μm) by using a doctor blade device with a 3 m/m in condition.

On the coated polyvinylidene fluoride (PVdF), a lithium foil of a 20 μm thickness is covered on top, roll pressed, and finally heated at 60° C. for 2 h in a vacuum oven, thereby curing the PVdF between the copper current collector and the lithium foil to be the adhesive layer.

(2) Manufacture of a Lithium Battery

Instead of the negative electrode of Comparative Example 1, the negative electrode of Comparative Example 2 is used, and the rest of the lithium metal rechargeable battery is manufactured by the same method as Comparative Example 1.

EXEMPLARY EXAMPLES 1 TO 3

(1) Manufacture of a Negative Electrode

Instead of Comparative Example 1 described in Table 1 below, the composition for forming each adhesive layer of Exemplary Examples 1 to 3 was used, and the negative electrode of Exemplary Examples 1 to 3 is manufactured in the same method as Comparative Example 1. Specifically, the composition for forming the adhesive layer of Exemplary Examples 1 to 3 uses polyvinylidene fluoride (PVdF) as the binder and Super-P as the conductive material. However, the solvent content in each composition of 100.0 wt % of Exemplary Examples 1 to 3 is the same at 60.0 wt %, but content of each of the binder and the conductive material is different.

(2) Manufacture of a Lithium Battery

Instead of the negative electrode of Comparative Example 1, each negative electrode of Exemplary Examples 1 to 3 is used, and the rest of the lithium batteries of Exemplary Examples 1 to 3 are manufactured in the same manner as Comparative Example 1.

COMPARATIVE EXAMPLE 3

(1) Manufacture of a Negative Electrode

Polyvinylidene fluoride (PVdF) and Super-P are coated on the copper current collector, but they are dry-coated without using a solvent.

Specifically, only polyvinylidene fluoride (PVdF) is uniformly coated on the copper current collector having a cross-section of 1.76 cm² and the circular shape (thickness: 10 μm) with the 3 m/min condition by using the doctor blade device.

On the coated polyvinylidene fluoride and Super-P, the lithium foil (Li foil) with a thickness of 20 μm is covered thereon, roll pressed, and finally heated at 60° C. for 2 hours in a vacuum oven to cure the PVdF between the copper current collector and the lithium foil, thereby being converted into an adhesive layer.

(2) Manufacture of a Lithium Battery

Instead of the negative electrode of Exemplary Example 1, the negative electrode of Comparative Example 3 is used, and the rest of the lithium metal rechargeable battery is manufactured in the same manner as in Exemplary Example 1.

EXEMPLARY EXAMPLES 4 AND 5

(1) Manufacture of a Negative Electrode

Instead of Comparative Example 1 described in the following Table 1, the composition for forming each adhesive layer of Exemplary Examples 4 and 5 is used, and the rest of the negative electrode of Exemplary Examples 4 and 5 is manufactured in the same method as Comparative Example 1. In detail, the composition forming the adhesive layer of the exemplary examples 4 and 5 uses polyvinylidene fluoride (PVdF) as the binder and the CNT as the conductive material. However, the solvent content in each composition of 100.0 wt % of Exemplary Examples 4 and 5 is the same at 60.0 wt %, but each content of the binder and the conductive material is different.

(2) Manufacture of a Lithium Battery

Instead of the negative electrode of Comparative Example 1, each negative electrode of Exemplary Examples 4 and 5 is used, and the rest of each lithium battery of Exemplary Examples 4 and 5 is manufactured by the same method as Comparative Example 1.

COMPARATIVE EXAMPLE 4

(1) Manufacture of a Negative Electrode

The adhesive layer is not formed in the negative electrode of Comparative Example 4 (i.e., the binder and the conductive material are not applied), and the negative electrode of Comparative Example 4 is manufactured by a physical compression method that is conventionally and commercially available.

Specifically, on the copper current collector having a cross-section of 1.76 cm² and a circular shape (a thickness of 10 μm), the lithium foil (Li foil) having a thickness of 20 μm is covered, and then roll-pressed to press the copper current collector and the lithium foil without the adhesive layer.

(2) Manufacture of a Lithium Battery

Instead of the negative electrode of Exemplary Example 1, the negative electrode of Comparative Example 4 is used, and the rest of the lithium battery of Comparative Example 4 is manufactured by the same method as Exemplary Example 1.

TABLE 1

| | Adhesive layer component | | Adhesive layer formation method | Composition for forming adhesive layer (composition entire weight: 100.0 wt %) | | |
|---|---|---|---|---|---|---|
| | binder | conductive material | | binder | conductive material | Solvent (NMP) |
| Comparative Example 1 | PVdF | — | wet | 40.0 wt % | 0.0 wt % | 60.0 wt % |
| Exemplary Example 1 | PVdF | Super-P | wet | 30.0 wt % | 10.0 wt % | 60.0 wt % |
| Exemplary Example 2 | PVdF | Super-P | wet | 20.0 wt % | 20.0 wt % | 60.0 wt % |
| Exemplary Example 3 | PVdF | Super-P | wet | 10.0 wt % | 30.0 wt % | 60.0 wt % |
| Exemplary example 4 | PVdF | CNT | wet | 20.0 wt % | 30.0 wt % | 60.0 wt % |

TABLE 1-continued

| | Adhesive layer component | | Adhesive layer formation method | Composition for forming adhesive layer (composition entire weight: 100.0 wt %) | | |
|---|---|---|---|---|---|---|
| | binder | conductive material | | binder | conductive material | Solvent (NMP) |
| Exemplary Example 5 | PVdF | CNT | wet | 10.0 wt % | 30.0 wt % | 60.0 wt % |
| Comparative Example 2 | PVdF | — | dry | 100 wt % | 0.0 wt % | 0.0 wt % |
| Comparative Example 3 | PVdF | Super-P | dry | 60 wt % | 40 wt % | 0.0 wt % |
| Comparative Example 4 | (an adhesive layer is not formed, that is, a binder and a conductive material are applied to a negative electrode) | | | | | |

EXPERIMENTAL EXAMPLE 1 (SEM MEASUREMENT OF CROSS-SECTION OF A LITHIUM BATTERY)

Figure 2A:
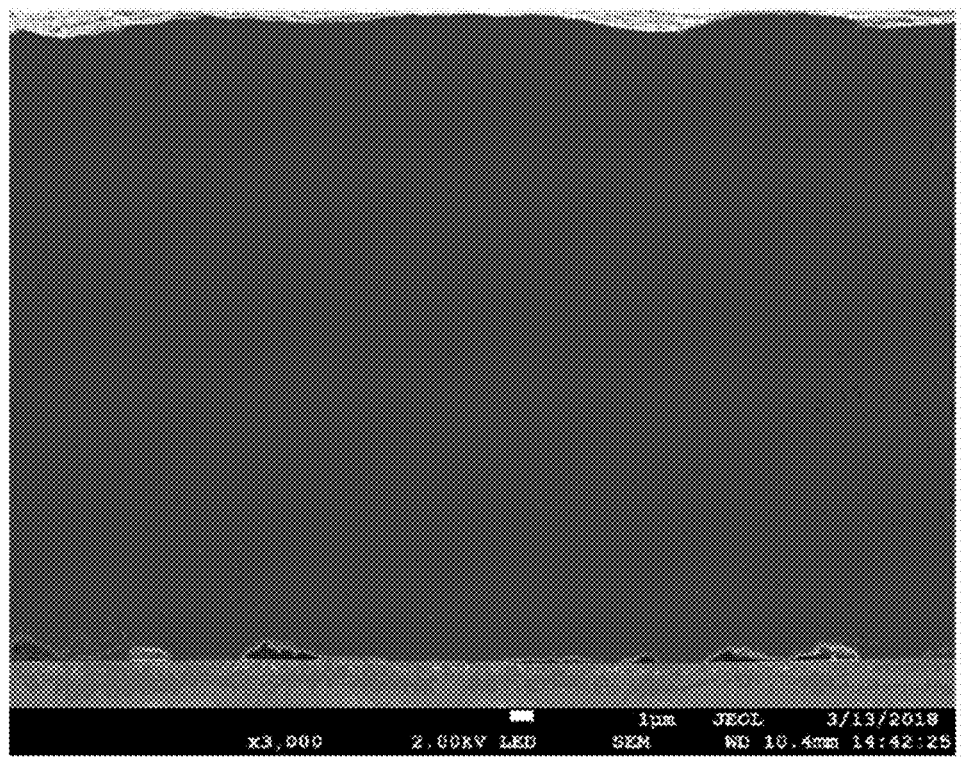
FIG. 2A is a SEM image showing a cross-section of a negative electrode of Exemplary Embodiment 2.

A SEM image of a cross-section of each negative electrode of Comparative Example 4 and Exemplary Example 2 is shown in FIG. 2.

However, in the case of the lithium metal, it is difficult to measure the adherence of the electrode separately because of high reactivity with air, and ductility. Therefore, in the state that each lithium battery of Comparative Example 4 and Exemplary Example 2 is manufactured and charged to SOC100, the battery is disassembled and the cross-section of the negative electrode is measured by SEM.

Figure 2B:
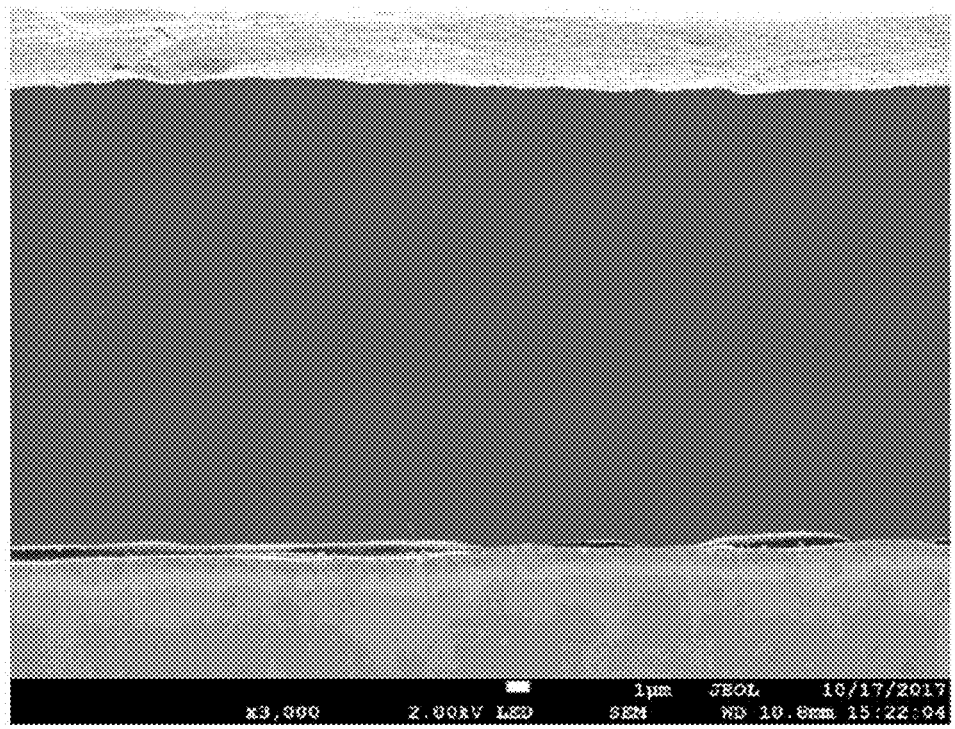
FIG. 2B is a SEM image showing a cross-section of a negative electrode of Comparative Example 4.

Referring to FIG. 2B, in the case of Comparative Example 4, it may be confirmed that the negative current collector and the lithium metal thin membrane (i.e., the lithium foil) are not properly adhered, and the gap between them is generated. In contrast, referring to FIG. 2A, in Exemplary Example 2, it may be confirmed that the gap between the negative current collector and the lithium metal thin membrane does not occur and adhesion is well established.

Such negative electrode adherence is a factor affecting the lifespan, internal resistance, and the like of the lithium battery. Specifically, as the negative electrode adherence decreases, the gap between the negative current collector and the lithium metal thin membrane is generated during the driving of the lithium battery including the same, the resistance occurs, the lifespan of the lithium battery may be deteriorated.

In a following experimental example, except for Comparative Example 4 in which the negative electrode adherence is low, the adhesive layer is formed between the negative current collector and the lithium metal thin membrane, but cases differentiating the formation method thereof (i.e., Exemplary Examples 1 to 3 and Comparative Examples 1 to 3) are described.

EXPERIMENTAL EXAMPLE 2 (AN EVALUATION OF A LIFESPAN CHARACTERISTIC OF A LITHIUM BATTERY)

In the following conditions, a cycle of each lithium battery is carried out, and the characteristics of the capacity after the 30th cycle and the capacity after the 100th cycle compared with initial capacity are evaluated, and the evaluation results are recorded in Table 2 below.

Charge: 0.1 C, CC/CV, 4.25 V, 1/20 C cut-off
Discharge: 0.5 C, CC, 3.0 V cut-off

TABLE 2

| | Capacity retention (%) | |
|---|---|---|
| | @ 30$^{th}$ | @ 100$^{th}$ |
| Comparative Example 1 | 96.2 | 83.8 |
| Exemplary Example 1 | 97.1 | 85.2 |
| Exemplary Example 2 | 98.3 | 91.8 |
| Exemplary Example 3 | 97.6 | 89.2 |
| Exemplary Example 4 | 96.3 | 87.8 |
| Exemplary Example 5 | 97.2 | 88.5 |
| Comparative Example 2 | 89.5 | 73.2 |
| Comparative Example 3 | 91.3 | 75.3 |

According to Table 2, it may be confirmed that the capacity retention of the battery varies depending on whether the conductive material is used, the amount of the use, or the type of conductive material is changed. In detail, compared with a case (Comparative Example 1) using only the binder as an adhesive layer component, the capacity retention is excellent after the battery 100th cycles in the case (Exemplary Examples 1 to 5) of adding the conductive material, and this is because the conductive material may offset the resistance due to the binder of the adhesive layer.

In addition, in Table 2, the difference according to the adhesive layer forming method may also be confirmed. Specifically, when comparing the cases using the same adhesive layer component (e.g., Comparative Example 1 vs. Comparative Example 2; Exemplary Examples 1 to 3 vs. Comparative Example 3), in the case of forming the adhesive layer by the dry process compared to the wet process, it is confirmed that the capacity retention of the battery is significantly lowered.

This is inferred to be a result of the gap being generated between the negative current collector and the lithium metal thin membrane (i.e., the lithium foil) during the driving of the battery and the resistance being formed as the adherence of the adhesive layer formed by the dry process compared to the wet is inferior.

On the other hand, according to the wet process, it is possible to evenly coat the adhesive layer component onto the copper current collector because of the solvent, and as the solvent volatilizes in the drying process after compressing the lithium foil, the adherence of the copper current collector and the lithium foil is strengthened through the adhesive layer as well as the adhesive force between the adhesive layer components, thereby it can be inferred that the increase in resistance of the battery is minimized and the stable operation is possible.

On the other hand, in the case using Super-P as the conductive material along with the binder as the adhesive layer component, it may be confirmed that the characteristic of the battery of Exemplary Example 2 with the weight ratio of the conductive material/the binder as 1 is the best and the capacity retention is partially deteriorated when the conductive material content is reduced (Exemplary Example 1) and increased (Exemplary Example 3).

Of course, Exemplary Examples 1 and 3 also express excellent capacity retention as the lithium battery. However, by optimizing the weight ratio of the conductive material and the binder as in Exemplary Example 2, the capacity of the lithium battery may be maintained by as much as 91.8% after the first 100 cycles compared to the beginning.

EXPERIMENTAL EXAMPLE 3 (RESISTANCE MEASUREMENT AFTER 100th CYCLE DRIVING OF A LITHIUM BATTERY)

Before evaluating Experimental Example 2 (i.e., before the cycle of each battery) and after the evaluation (i.e., after 100 cycles of each battery), each battery is fitted to SOC100 as 4.25 V/0.05 C cut-off and then the resistance is measured. In each case, two measurements are performed using an instrument (EC lab) using an electrochemical impedance spectroscopy (EIS) method and a Hioki instrument (Hioki 3555 Battery HiTESTER), and are recorded in Table 3 below.

TABLE 3

| | Resistance characteristic | | | |
| --- | --- | --- | --- | --- |
| | Hioki | | EIS (1 Hz) | |
| | Before a cycle | After 100th cycle | Before a cycle | After 100th cycle |
| Comparative Example 1 | 0.27 | 0.33 | 0.51 | 0.92 |
| Exemplary Example 1 | 0.26 DeletedTexts | 0.31 DeletedTexts | 0.47 DeletedTexts | 0.9 DeletedTexts |
| Exemplary Example 2 | 0.23 | 0.29 | 0.4 | 0.73 |
| Exemplary Example 3 | 0.23 | 0.3 | 0.43 | 0.8 |
| Exemplary Example 4 | 0.25 | 0.31 | 0.45 | 0.87 |
| Exemplary Example 5 | 0.24 | 0.3 | 0.45 | 0.88 |
| Comparative Example 2 | 0.35 | 0.7 | 0.79 | 1.53 |
| Comparative Example 3 | 0.31 | 0.55 | 0.68 | 1.33 |

Also in Table 3, it may be confirmed that the resistance characteristic of the battery varies depending on whether the conductive material is used, the amount of the use, or if the type of the conductive material is changed. Specifically, compared to the case where the binder is used as the adhesive layer component alone (Comparative Example 1), when the conductive material is added (Exemplary Examples 1 to 5), the initial resistance of the battery is relatively low, and the resistance increase rate is relatively low, because the conductive material may offset the resistance due to the binder of the adhesive layer component.

In addition, in Table 3, the difference according to the adhesive layer forming method may also be confirmed. In detail, when comparing the cases (e.g., Comparative Example 1 vs. Comparative Example 2; Exemplary Examples 1 to 3 vs. Comparative Example 3) using the same adhesive layer component, in the case forming the adhesive layer by the dry compared with the wet, it is confirmed that the initial resistance of the battery and the resistance increasing rate are remarkably increased. This is inferred to be a result of the gap being generated between the negative current collector and the lithium metal thin membrane (i.e., the lithium foil) during the driving of the battery and the resistance being formed as the adherence of the adhesive layer formed by the dry process compared to the wet is inferior.

On the other hand, in the case using Super-P as the conductive material along with the binder as the adhesive layer component, it may be confirmed that the initial resistance of the battery of Exemplary Example 2 with the weight ratio of the conductive material/the binder as 1 is lowest, and the initial resistance and the resistance increasing ratio are increased when the conductive material content is reduced (Exemplary Example 1) and increased (Exemplary Example 3).

Of course, Exemplary Examples 1 and 3 also exhibits to show the initial resistance and the resistance increasing in a suitable degree as the lithium battery. However, by optimizing the weight ratio of the conductive material and the binder as in Exemplary Example 2, the initial resistance of the battery may be further lowered and low resistance may be maintained even after 100 cycles.

INDUSTRIAL APPLICABILITY

In an exemplary embodiment of the present invention, the binder included in the adhesive layer contributes to improving the adherence between the negative current collector and the negative active material of the lithium battery. Accordingly, the negative electrode with improved adherence may not only improve the lifespan characteristic, the safety, etc. of the lithium battery, but may also help to implement the lithium battery in the form of a fully solid battery.

Furthermore, the conductive material included in the adhesive layer contributes to improving the conductivity of the negative electrode. Accordingly, the negative electrode with improved conductivity lowers the initial resistance of the battery and suppresses the increase in resistance during the cycle.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A negative electrode for a lithium metal battery comprising:
   a negative current collector comprising a first and a second surface;
   an adhesive layer disposed on the first surface or both the first and second surface of the negative current collector,
   wherein the adhesive layer comprises a binder and a conductive material; and
   a lithium metal membrane disposed on a surface of the adhesive layer, wherein the adhesive layer is obtained by mixing the binder, the conductive material and a solvent to obtain a mixture, and coating the mixture on the first surface or both the first and second surface of the negative current collector using a doctor blade, wherein the binder is present in an amount ranging from 10 wt % to 30 wt % based on a total composition amount of 100 wt %, and the conductive material is present in an amount ranging from 10 wt % to 30 wt % based on a total composition amount of 100 wt %.

2. The negative electrode for the lithium metal battery of claim 1, wherein the binder comprises at least one selected from a group consisting of polyvinylidene fluoride (PVDF) and derivatives of PVDF.

3. The negative electrode for the lithium metal battery of claim 1, wherein the conductive material comprises at least one selected from a group consisting of carbon black, carbon nanotubes, natural graphite, artificial graphite, and carbon fiber.

4. The negative electrode for the lithium metal battery of claim 1, wherein a weight ratio of the conductive material to the binder ranges from ¼ to 4.

5. The negative electrode for the lithium metal battery of claim 1, wherein a thickness ratio of the adhesive layer to the negative current collector ranges from 1/10 to 1/15.

6. The negative electrode for the lithium metal battery of claim 1, wherein a thickness ratio of the adhesive layer to the lithium metal membrane ranges from 1/30 to 1/40.

7. The negative electrode for the lithium metal battery of claim 1, wherein the negative current collector comprises lithium or copper.

8. A manufacturing method of a negative electrode for a lithium metal battery, comprising:

a step of coating a composition comprising a binder, a conductive material, and a solvent on one surface or both surfaces of a negative current collector; and a step of stacking a lithium metal membrane on the coated surface of the negative current collector, wherein the binder is present in an amount ranging from 10 wt % to 30 wt % based on a total composition amount of 100 wt %, and the conductive material is present in an amount ranging from 10 wt % to 30 wt % based on a total composition amount of 100 wt %.

9. The manufacturing method of claim 8, wherein, in the step of coating the composition comprising the binder, the conductive material, and the solvent on one surface or both surfaces of the negative current collector, a coated amount of the composition for a cross-section of the negative current collector is 0.005 $g/cm^2$ to 0.01 $g/cm^2$.

10. The manufacturing method of claim 8, further comprising, before the step of stacking the lithium metal membrane on the coated surface the negative current collector, a step of drying the coated composition.

11. The manufacturing method of claim 8, further comprising, after the step of stacking the negative current collector and the lithium metal membrane on the coated surface the negative current collector, a step of compressing the stacked negative current collector and lithium metal membrane.

12. The manufacturing method of claim 11, wherein the compression step is performed by applying heat and/or pressure.

13. A lithium battery comprising:
the negative electrode of claim 1;
an electrolyte; and
a positive electrode.

* * * * *